(12) United States Patent
Mukai

(10) Patent No.: US 9,302,552 B2
(45) Date of Patent: Apr. 5, 2016

(54) PNEUMATIC TIRE

(71) Applicant: Sumitomo Rubber Industries, Ltd., Kobe-shi, Hyogo (JP)

(72) Inventor: Tomoyuki Mukai, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 742 days.

(21) Appl. No.: 13/655,560

(22) Filed: Oct. 19, 2012

(65) Prior Publication Data
US 2013/0112325 A1 May 9, 2013

(30) Foreign Application Priority Data

Nov. 8, 2011 (JP) ................. 2011-244767

(51) Int. Cl.
*B60C 11/03* (2006.01)
*B60C 11/12* (2006.01)
*B60C 11/13* (2006.01)

(52) U.S. Cl.
CPC ......... *B60C 11/1369* (2013.04); *B60C 11/0304* (2013.04); *B60C 11/125* (2013.04); *B60C 11/1323* (2013.04); *B60C 2011/0353* (2013.04); *B60C 2011/0369* (2013.04); *B60C 2011/0374* (2013.04); *B60C 2011/0379* (2013.04); *B60C 2011/0381* (2013.04); *B60C 2011/0388* (2013.04)

(58) Field of Classification Search
CPC ............ B60C 11/0304; B60C 11/1323; B60C 2011/0353; B60C 2011/0388; B60C 11/042; B60C 11/1315; B60C 2011/0386; B60C 2011/0341; B60C 11/03; B60C 11/04; B60C 11/125; B60C 11/1369; B60C 2011/0369; B60C 2011/0374; B60C 2011/0379; B60C 2011/0381
USPC ........ 152/209.8, 209.16, 209.18, 209.24, 901
See application file for complete search history.

(56) References Cited

U.S. PATENT DOCUMENTS

| 5,407,005 A * | 4/1995 | Consolacion et al. ..... 152/209.9 |
| 2003/0047262 A1 * | 3/2003 | Kousaie et al. ............ 152/209.8 |
| 2005/0092413 A1 * | 5/2005 | Miyazaki ................. 152/209.24 |
| 2008/0000564 A1 | 1/2008 | Mukai |
| 2010/0018619 A1 * | 1/2010 | Matsumoto .............. 152/209.18 |
| 2010/0139826 A1 * | 6/2010 | Matsumoto .............. 152/209.18 |
| 2010/0294409 A1 * | 11/2010 | Bolzoni et al. ........... 152/209.18 |

FOREIGN PATENT DOCUMENTS

JP     2009-149124 A    7/2009

* cited by examiner

*Primary Examiner* — Eric Hug
(74) *Attorney, Agent, or Firm* — Birch, Stewart, Kolasch & Birch, LLP

(57) ABSTRACT

A pneumatic tire has an asymmetric tread pattern. The width of an outboard shoulder main groove (3) is 3 to 4% of the tread width TW. The width of an inboard shoulder main groove (4) is 5 to 6% of TW. The width of an outboard crown main groove (5) is 6 to 7% of TW. The width of an inboard crown main groove (6) is 6 to 7% of TW. In each of the grooves (4, 5, 6), an outboard groove face's angle θ1 is more than an inboard groove face's angle θ2, wherein θ1 is 13 to 19 degrees, and θ2 is 9 to 14 degrees. In the groove (3), an outboard groove face's angle θ3 is 9 to 14 degrees, and an inboard groove face's angle θ4 is 5 to 8 degrees.

7 Claims, 4 Drawing Sheets

PNEUMATIC TIRE

BACKGROUND OF THE INVENTION

The present invention relates to a pneumatic tire, more particularly to an asymmetric tread pattern capable of improving the drainage while maintaining the steering stability and noise performance.

In recent years, users of high-performance passenger cars have a preference for pneumatic tires having straight main grooves extending continuously in the tire circumferential direction.

In order to improve wet performance of such pneumatic tire by improving drainage, if the width of a straight main groove is increased, as well known in the art, air existing in a tube formed between the road surface and the main groove in the ground contacting patch of the tire, becomes liable to resonate during running and the noise performance is deteriorated. Further, there is a tendency that the rigidity of the tread portion is decreased and thereby the steering stability is deteriorated.

SUMMARY OF THE INVENTION

It is therefore, an object of the present invention to provide a pneumatic tire in which the drainage is improved while maintaining the steering stability and noise performance.

According to the present invention, a pneumatic tire comprises a tread portion provided with an asymmetric tread pattern and having an outboard tread edge and an inboard tread edge between which a tread width is defined, the tread portion provided with circumferentially continuously extending main grooves including an outboard shoulder main groove, an inboard shoulder main groove, an outboard crown main groove and an inboard crown main groove to axially divide the tread portion into an outboard shoulder land section defined between the outboard shoulder main groove and the outboard tread edge, an outboard middle land section defined between the outboard shoulder main groove and the outboard crown main groove, an crown land section defined between the outboard crown main groove and the inboard crown main groove, an inboard middle land section defined between the inboard crown main groove and the inboard shoulder main groove, and an inboard shoulder land section defined between the inboard shoulder main groove and the inboard tread edge, wherein the groove width of the outboard shoulder main groove is 3 to 4% of the tread width, the groove width of the inboard shoulder main groove is 5 to 6% of the tread width, the groove width of the outboard crown main groove is 6 to 7% of the tread width, the groove width of the inboard crown main groove is 6 to 7% of the tread width, in each of the inboard shoulder main groove, the inboard crown main groove and the outboard crown main groove, an outboard groove face's angle $\theta 1$ is more than an inboard groove face's angle $\theta 2$, the outboard groove face's angle $\theta 1$ is 13 to 19 degrees, and the inboard groove face's angle $\theta 2$ is 9 to 14 degrees, in the outboard shoulder main groove, an outboard groove face's angle $\theta 3$ is 9 to 14 degrees, and an inboard groove face's angle $\theta 4$ is 5 to 8 degrees, the outboard shoulder land section is provided with a plurality of outboard shoulder lateral grooves extending axially inwardly from a position axially outside the outboard tread edge, the outboard shoulder lateral grooves include first outboard shoulder lateral grooves whose axially inner ends are connected to the outboard shoulder main groove, and second outboard shoulder lateral grooves whose axially inner ends are terminated within the outboard shoulder land section without connected to the outboard shoulder main groove, and the first outboard shoulder lateral grooves and the second outboard shoulder lateral grooves are arranged alternately in the tire circumferential direction, the outboard middle land section is provided with a plurality of outboard middle lateral grooves extending axially inwardly from the outboard shoulder main groove and terminating within the outboard middle land section without connected to the outboard crown main groove.

The pneumatic tire according to the present invention may be further provided with the following optional features:

the tread portion is provided with a plurality of inboard lateral grooves extending from the tire equator to a position axially outside the inboard tread edge;

each of the first outboard shoulder lateral grooves is provided in an axially inner part thereof with a tie bar rising from the groove bottom and provided with a sipe;

the outboard shoulder land section is provided with a plurality of outboard shoulder sub grooves, and each of the outboard shoulder sub grooves extends from one of the second outboard shoulder lateral grooves toward one circumferential direction across the adjacent first outboard shoulder lateral groove to a position near the next second outboard shoulder lateral groove to terminate without reaching thereto; and the axial distance between the center line of the outboard shoulder main groove and the tire equator is in a range of from 23.5 to 27.5% of the tread width, the axial distance between the center line of the inboard shoulder main groove (4) and the tire equator is in a range of from 23.0 to 29.5% of the tread width, the axial distance between the center line of the outboard crown main groove and the tire equator is in a range of from 6.0 to 10.5% of the tread width, and the axial distance between the center line of the inboard crown main groove and the tire equator is in a range of from 6.0 to 10.5% of the tread width.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used. The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various cold Inflation Pressures" table in TRA or the like. The standard load is the "maximum load capacity" in JATMA, the "Load Capacity" in ETRTO, the maximum value given in the above-mentioned table in TRA or the like. In case of passenger car tires, however, the standard pressure and standard tire load are uniformly defined by 180 kPa and 88% of the maximum tire load, respectively.

The inboard tread edge Tei refers to one of the two tread edges Te which is intended to be positioned towards the center of the vehicle body. The outboard tread edge Teo refers to the other tread edge which is intended to be positioned away from the center of the vehicle body.

According thereto, in this application, the terms "outboard" and "inboard" are used toward the outboard tread edge and inboard tread edge, respectively, to refer relative positions in the tire axial direction.

Further, the terms "axially inner", "axially inward" and the like are used toward the tire equator, and the terms "axially outer", "axially outward" and the like are used toward the tread edge in order to refer relative positions in the tire axial direction.

The tread edges Te are the axial outermost edges of the ground contacting patch which occurs under the normally inflated loaded condition when the camber angle of the tire is zero.

The tread width TW is the width measured under the normally inflated unloaded condition, as the axial distance between the tread edges Te determined as above.

DESCRIPTION OF THE PREFERRED EMBODIMENTS

Embodiments of the present invention will now be described in detail in conjunction with the accompanying drawings.

According to the present invention, the pneumatic tire comprises a tread portion 2, a pair of sidewall portions, a pair of bead portions each with a bead core therein, a carcass extending between the bead portions, and a tread reinforcing belt disposed radially outside the carcass in the tread portion as usual.

The tread portion 2 is provided with a tread pattern of left-right asymmetry (asymmetry about the tire equator C) defined by tread grooves. The tread portion 2 has an outboard tread edge 2o to be positioned away from the center of the vehicle body and an inboard tread edge 2i to be positioned close to the center of the vehicle body. For that purpose, the mounting position of the tire is specified. For example, the sidewall portion to be located on outside is provided with an indication such as "outside", and the sidewall portion to be located on inside is provided with an indication such as "inside".

In the following embodiment, the pneumatic tire is nondirectional (or bidirectional), and designed for passenger cars.

The tread grooves include circumferentially continuously extending main grooves 3-6.

Figure 1:
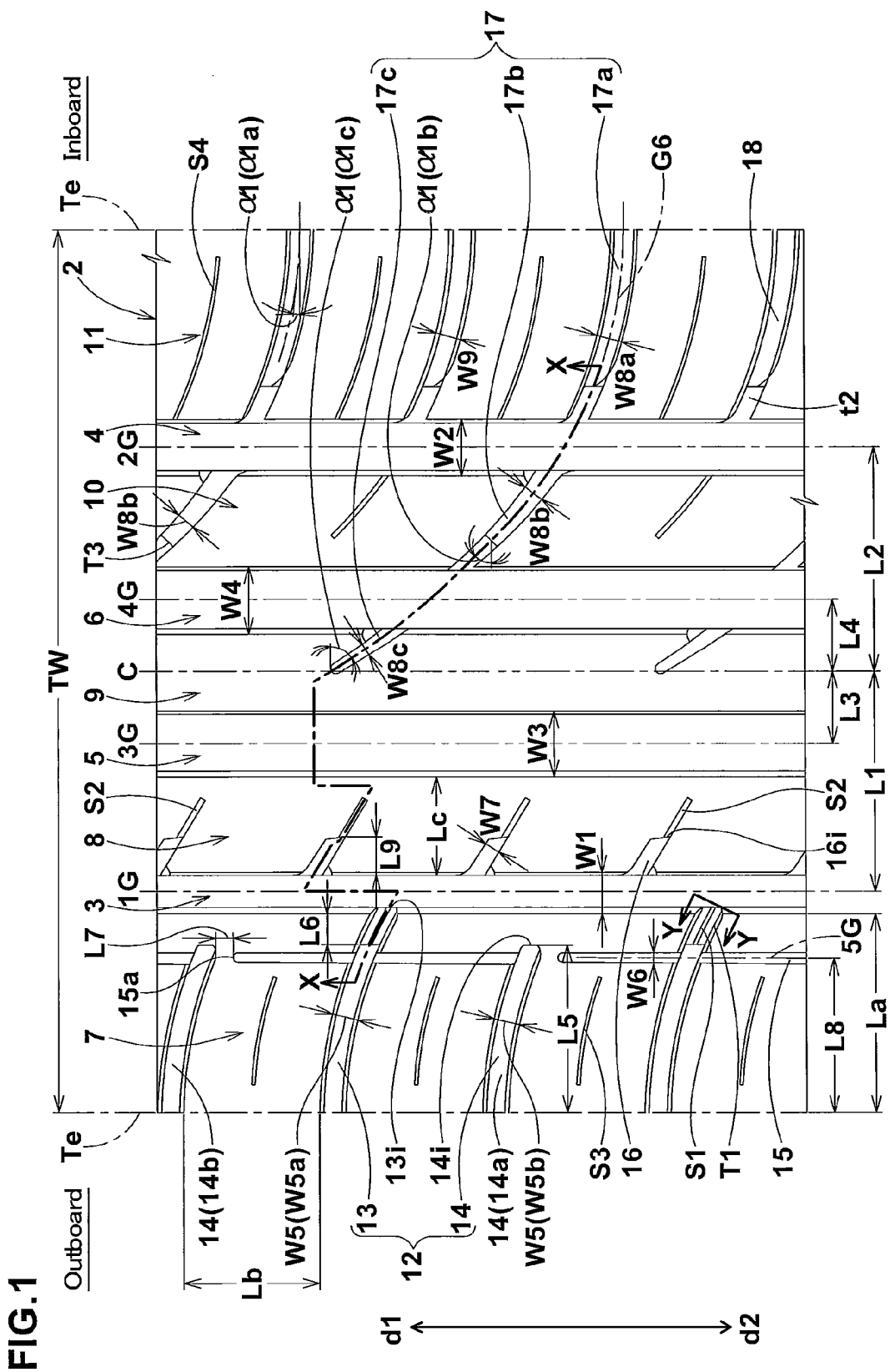
FIG. 1 is a developed partial plan view of a pneumatic tire as an embodiment of the present invention showing a tread pattern.

In the example shown in FIG. 1, the main grooves are: an outboard shoulder main groove 3 which is axially outermost on the outboard tread edge side; an inboard shoulder main groove 4 which is axially outermost on the inboard tread edge side; an outboard crown main groove 5 between the outboard shoulder main groove 3 and the tire equator C; and an inboard crown main groove 6 between the outboard crown main groove 5 and the inboard shoulder main groove 4.

The tread portion 2 is therefore, axially divided into: an outboard shoulder land section 7 between the outboard shoulder main groove 3 and the outboard tread edge Teo; an outboard middle land section 8 between the outboard shoulder main groove 3 and the outboard crown main groove 5; a crown land section 9 between the outboard crown main groove 5 and the inboard crown main groove 6; an inboard middle land section 10 between the inboard crown main groove 6 and the inboard shoulder main groove 4; and an inboard shoulder land section 11 between the inboard shoulder main groove 4 and the inboard tread edge Tei.

In this example, the main grooves 3, 4, 5 and 6 are formed as straight grooves parallel with the tire circumferential direction from the aspects of drainage, land sections' rigidity, steering stability, behavior of vehicle during braking (to avoid drift) and the like.

From these aspects and also not to deteriorate noise performance, the groove width W1 of the outboard shoulder main groove 3 is set in a range of from 3 to 4% of the tread width TW, the groove width W2 of the inboard shoulder main groove 4 is set in a range of from 5 to 6% of the tread width TW, the groove width W3 of the outboard crown main groove 5 is set in a range of from 6 to 7% of the tread width TW, and the groove width W4 of the inboard crown main groove 6 is set in a range of from 6 to 7% of the tread width TW.

The term "groove width" used in this application means a width measured perpendicularly to the longitudinal direction of the groove.

The outboard crown main groove 5 and inboard crown main groove 6 are made wider than the outboard shoulder main groove 3 and inboard shoulder main groove 4 in order to secure sufficient rigidity for the inboard shoulder land section 11 and outboard shoulder land section 7 which are subjected to a large force in the tire axial direction during cornering and thereby to improve the steering stability.

Further, the outboard shoulder main groove 3 is made narrower than the inboard shoulder main groove 4 in order to relatively increase the rigidity of the outboard shoulder land section 7 subjected to a relatively large force in the tire axial direction during cornering and thereby to improve the steering stability.

The groove depths D1-D4 of the main grooves 3-6, respectively are preferably set in a range of not less than 7.0 mm, more preferably not less than 7.5 mm, but not more than 9.0 mm, more preferably not more than 8.5 mm.

In this example, the groove depth D1 of the outboard shoulder main groove 3 is equal to the groove depth D2 of the inboard shoulder main groove 4, and the groove depth D3 of the outboard crown main groove 5 is equal to the groove depth D4 of the inboard crown main groove 6.

As to the positions of the main grooves 3-6, from the aspect of a rigidity balance among the land sections 7-11 for effectively improving the steering stability, it is preferable that the axial distance L1 between the groove center line 1G of the outboard shoulder main groove 3 and the tire equator c is set in a range of from 23.5 to 27.5% of the tread width TW, the axial distance L2 between the groove center line 2G of the inboard shoulder main groove 4 and the tire equator c is set in a range of from 23.0 to 29.5% of the tread width TW, the axial distance L3 between the groove center line 3G of the outboard crown main groove 5 and the tire equator C is set in a range of from 6.0 to 10.5% of the tread width TW, and the axial distance L4 between the groove center line 4G of the inboard crown main groove 6 and the tire equator C is set in a range of from 6.0 to 10.5% of the tread width TW.

Figure 2:
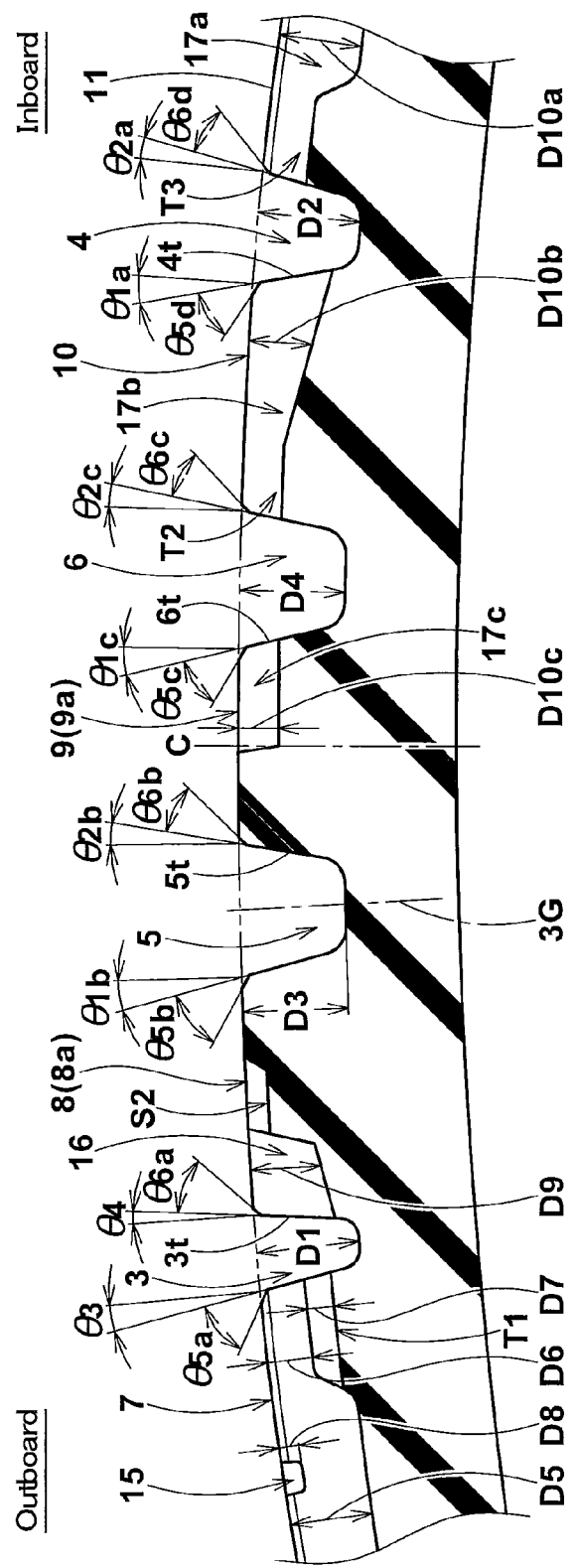
FIG. 2 is a cross sectional partial view of the tread portion thereof taken along line x-x in FIG. 1.

Each main groove (3, 4, 5, 6) has a pair of oppositely opposed groove faces (3t, 4t, 5t, 6t) extending from the groove top toward the groove bottom. The pair of oppositely opposed groove faces (3t, 4t, 5t, 6t) are an outboard groove face (3t1, 4t1, 5t1, 6t1) on the outboard tread edge side, and an inboard groove face (3t2, 4t2, 5t2, 6t2) on the inboard tread edge side. In the cross section of each main groove (3, 4, 5, 6) perpendicular to the longitudinal direction thereof, the outboard groove face (3t1, 4t1, 5t1, 6t1) extends radially inwardly from the tread surface while inclining to the center line (3G, 4G, 5G, 6G) of the main groove (3, 4, 5, 6), and the inboard groove face (3t2, 4t2, 5t2, 6t2) extends radially inwardly from the tread surface while inclining to the groove center line (3G, 4G, 5G, 6G) as shown in FIG. 2 and FIG. 3.

Figure 3:
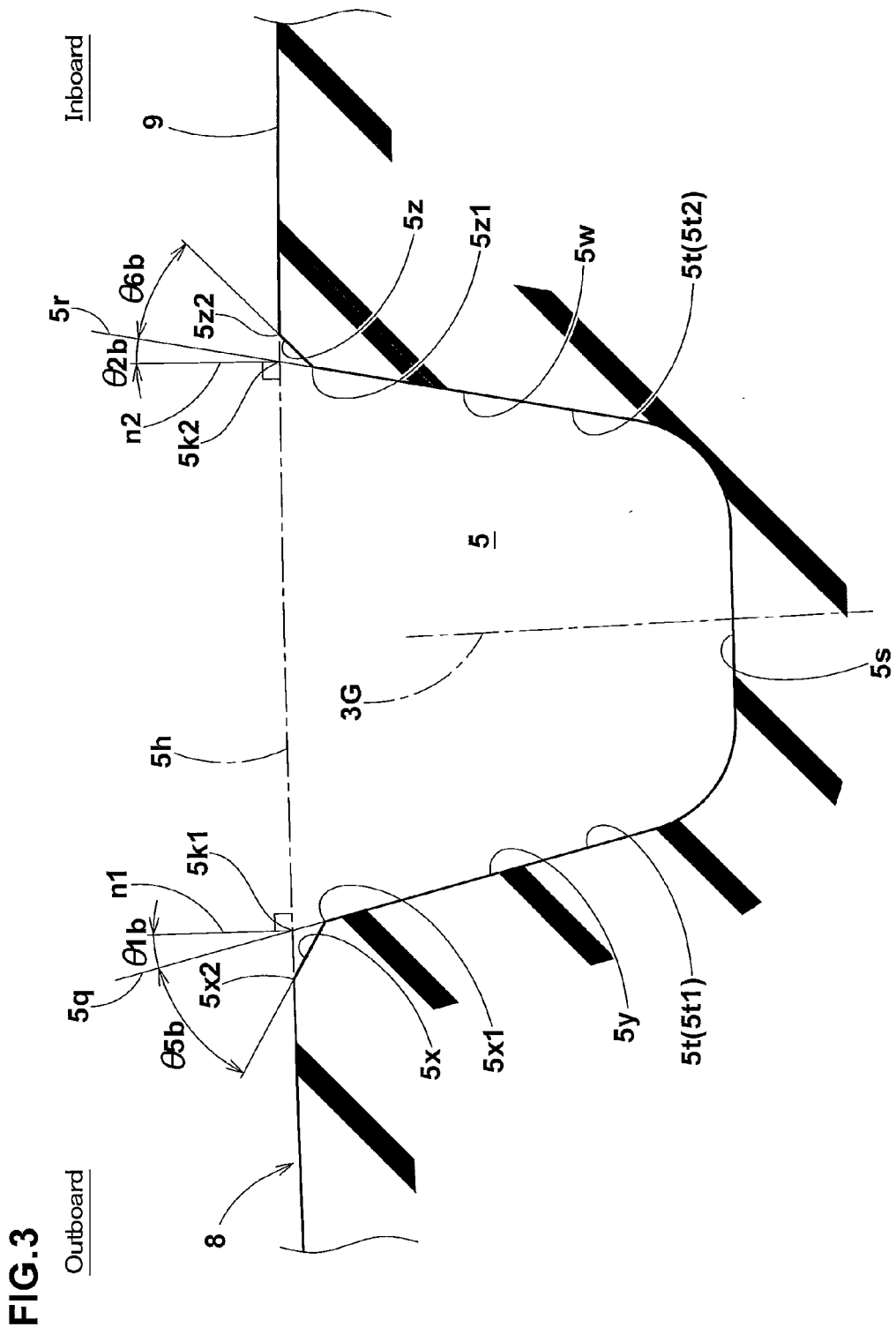
FIG. 3 is a cross sectional view of the outboard crown main groove.

In each main groove (3, 4, 5, 6) in this embodiment, as shown in FIG. 3 taking the outboard crown main groove 5 as an example, the outboard groove face (3t1, 4t1, 5t1, 6t1) is composed of an outboard chamfer (5x) extending for a short distance radially inwardly from the tread surface, and an outboard main portion (5y) forming a major part of the outboard groove face and extending from the radially inner edge of the outboard chamfer more steeply than the outboard chamfer.

Similarly, the inboard groove face (3t2, 4t2, 5t2, 6t2) is composed of an inboard chamfer (5z) extending for a short distance radially inwardly from the tread surface, and an inboard main portion (5w) forming a major part of the inboard groove face and extending from the radially inner edge of the inboard chamfer more steeply than the inboard chamfer.

In the cross section of the main groove perpendicular to the longitudinal direction thereof, the outboard main portion (5y) and the inboard main portion (5w) are straight, and the chamfers (5x, 5z) are also straight. But, the outboard and inboard main portions may be an arc extending from the radially inner edges of the inboard and outboard chamfers to the groove bottom (5s). Further, the chamfers may be an arc concave toward the radially outside.

In the inboard shoulder main groove 4, the outboard groove face's angle $\theta 1a$ is more than the inboard groove face's angle $\theta 2a$.

In the outboard crown main groove 5, the outboard groove face's angle $\theta 1b$ is more than the inboard groove face's angle $\theta 2b$.

In the inboard crown main groove 6, the outboard groove face's angle $\theta 1c$ is more than the inboard groove face's angle $\theta 2c$.

The outboard groove face's angles $\theta 1a$, $\theta 1b$ and $\theta 1c$ are set in a range of from 13 to 19 degrees.

The inboard groove face's angles $\theta 2a$, $\theta 2b$, and $\theta 2c$ are set in a range of from 9 to 14 degrees.

In the outboard shoulder main groove 3, the outboard groove face's angle $\theta 3$ is more than the inboard groove face's angle $\theta 4$.

The outboard groove face's angle $\theta 3$ is set in a range of from 9 to 14 degrees.

The inboard groove face's angle $\theta 4$ is set in a range of from 5 to 8 degrees.

Therefore, it becomes possible to maintain the rigidity of the land sections near the outboard groove edges subjected to a large lateral force during cornering, and thereby to improve the steering stability.

The groove face's angle ($\theta 1a$, $\theta 1b$, $\theta 1c$, $\theta 2a$, $\theta 2b$, $\theta 2c$, $\theta 3$, $\theta 4$) is an angle of the outboard/inboard main portion (5y/5w in FIG. 3) measured in the cross section of the concerned groove with respect to a normal (n1/n2 in FIG. 3) to the tread profile line (5h in FIG. 3). Strictly speaking, in the cross section of the groove, the tread profile line in the grooved part is defined by an almost straight line or a very slightly curved line smoothly connecting between the tread surfaces on both sides of the grooved part.

Since the inboard groove face's angle $\theta 4$ of the outboard shoulder main groove 3 is made smaller than the inboard groove face's angles $\theta 2a$, $\theta 2b$, and $\theta 2c$, and the groove width W1 of the outboard shoulder main groove 3 is made smaller than the groove widths W2-W4 of the main grooves 4-6.

Therefore, even if the outboard shoulder land section 7 and outboard middle land section 8 are deformed by the lateral force during cornering, the groove face of the outboard shoulder main groove 3 is prevented from contacting with the ground and thereby uneven wear can be prevented.

Further, in the present invention, owing to a synergistic effect of the decreased groove face's angle $\theta 4$, uneven wear of the outboard middle land section 8 caused during cornering is prevented, and owing to the increased groove volume, the drainage is improved.

Furthermore, it becomes possible to connect the after-mentioned outboard shoulder lateral grooves 12 and outboard middle lateral grooves 16 to the outboard shoulder main groove 3 with high severity in order to further improve the drainage.

From this standpoint, it is preferred that the outboard groove face's angle $\theta 3$ of the outboard shoulder main groove 3 is made smaller than the outboard groove face's angles $\theta 1a$, $\theta 1b$ and $\theta 1c$ of the main grooves 4-6.

In each main groove (3, 4, 5, 6) in this example, as shown in FIG. 3 taking the outboard crown main groove 5 as an example, the outboard chamfer's angle ($\theta 5a$, $\theta 5b$, $\theta 5c$ and $\theta 5d$) between the outboard chamfer (5x) and the outboard main portion (5y) (outboard extension 5q) is more than the inboard chamfer's angle ($\theta 6a$, $\theta 6b$, $\theta 6c$ and $\theta 6d$) between the inboard chamfer (5z) and the inboard main portion (5w) (inboard extension 5r).

Preferably, the outboard chamfer's angles $\theta 5a$, $\theta 5b$, $\theta 5c$ and $\theta 5d$ are set in a range of from 50 to 70 degrees, and the inboard chamfer's angles $\theta 6a$, $\theta 6b$, $\theta 6c$ and $\theta 6d$ are set in a range of from 35 to 55 degrees.

Therefore, it becomes possible to maintain the higher rigidity of the land section near the outboard groove edge subjected to large lateral force during cornering and further the steering stability can be improved.

The outboard shoulder land section 7 is provided with a plurality of outboard shoulder lateral grooves 12 extending from a position axially outside the outboard tread edge Teo toward the tire equator C The outboard shoulder lateral grooves 12 in this example are curved concavely toward one circumferential direction (d1) (upward in FIG. 1) and each have a substantially constant groove width in order that high rigidity and low resistance to drainage can be secured in the outboard shoulder land section 7 to thereby increase the steering stability and drainage.

The outboard shoulder lateral grooves 12 in this example include: first outboard shoulder lateral grooves 13 whose axially inner ends 13i are connected to the outboard shoulder main groove 3; and second outboard shoulder lateral grooves 14 whose axially inner ends 14i are terminated within the outboard shoulder land section 7 without connected to the outboard shoulder main groove 3. The first outboard shoulder lateral grooves and second outboard shoulder lateral grooves are arranged alternately in the tire circumferential direction. Therefore, the rigidity and drainage in the outboard shoulder land section 7 are secured and the steering stability and wet performance can be improved in a well balanced manner.

In order to improve the steering stability and wet performance in a well balanced manner, it is preferable that the axial length L5 of the second outboard shoulder lateral groove 14 is set in a range of not less than 75%, more preferably not less than 80% but not more than 95%, more preferably not more than 90% of the axial width La of the outboard shoulder land section 7.

In order to effectively derive the above described advantageous effect, it is desirable that the groove width W5 of the outboard shoulder lateral groove 12 is set in a range of from 2.0 to 5.0 mm and the groove depth D5 of the outboard shoulder lateral groove 12 is set in a range of from 6.0 to 7.0 mm.

In this example, the groove width W5a of the first outboard shoulder lateral groove 13 is equal to the groove width W5b of the second outboard shoulder lateral groove 14, and the groove depth D5a of the first outboard shoulder lateral groove 13 is equal to the groove depth of the second outboard shoulder lateral groove 14.

Figure 4:
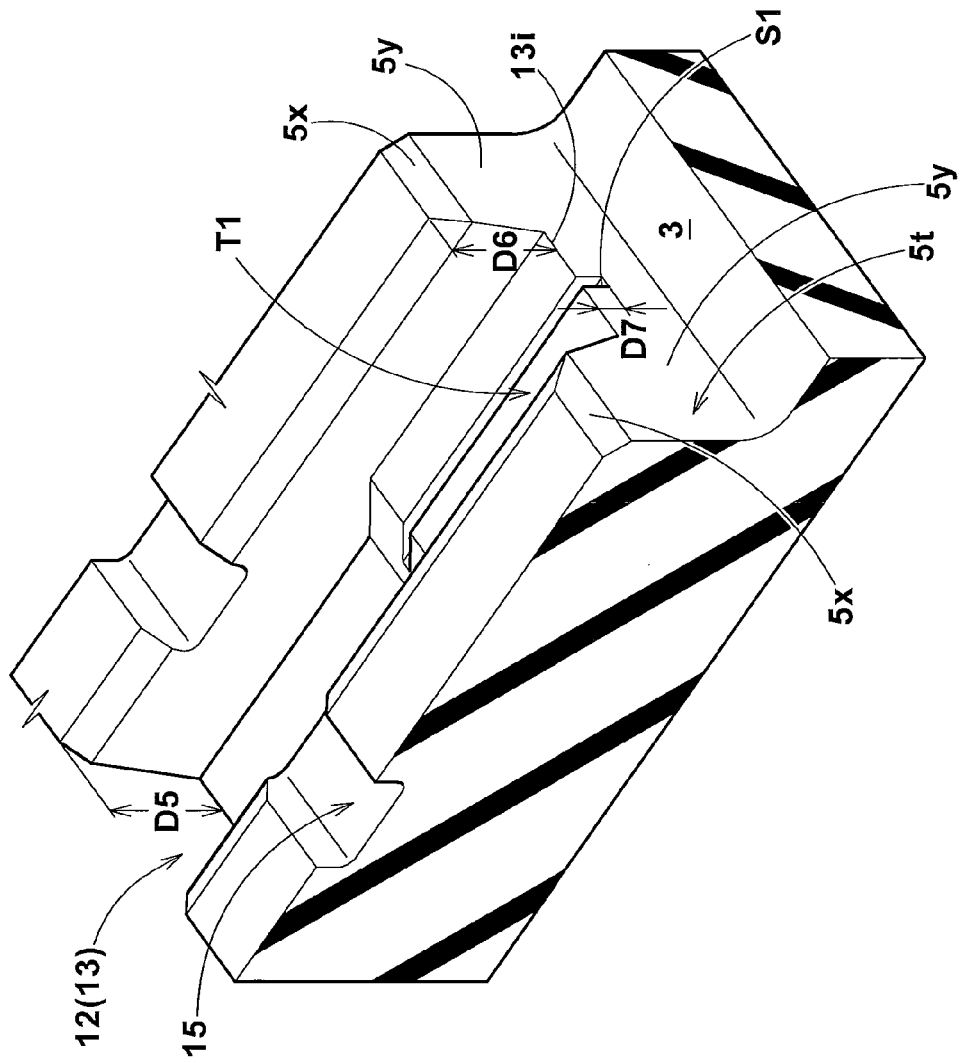
FIG. 4 is a perspective view taken in the direction of arrow Y in FIG. 1.

As shown in FIG. 4, the first outboard shoulder lateral grooves 13 in this example are each provided with an outboard shoulder tie bar T1 rising from the groove bottom and extending toward the outboard tread edge Teo from the axially inner end 13i of the groove 13.

Preferably, the axial length L6 of the outboard shoulder tie bar T1 is set in a range of from 10 to 20% of the axial width La of the outboard shoulder land section 7.

The groove depth D6 at the outboard shoulder tie bar T1 is preferably set in a range of from 3.0 to 4.0 mm.

Therefore, the outboard shoulder tie bar T1 can increase the rigidity of the outboard shoulder land section 7 in the vicinity of the axially inner end 13i, and further can reduce the transmittance of air resonance sound generated in the outboard shoulder main groove 3 toward the outboard tread edge to improve the noise performance.

The outboard shoulder tie bar T1 in this example is provided with an outboard shoulder sipe S1 extending along the longitudinal direction of the outboard shoulder tie bar T1.

As to the outboard shoulder sipe S1, a closed type in which both ends of the sipe are closed, or a semi-open type in which one end of the sipe is opened but the other end is closed can be used. In this example, however, an open type in which both ends of the sipe are opened is employed. In this case, in order to improve the steering stability and drainage in a well balanced manner, the depth D7 of the sipe is preferably set in a range of from 1.5 to 2.5 mm.

Preferably, the sum total of the depth D6 and the depth D7 is 90 to 100% of the groove depth D5a of the first outboard shoulder lateral groove 13.

The outboard shoulder land section 7 is provided with a plurality of outboard shoulder sub grooves 15 in order to enhance the drainage of water existing between the outboard shoulder land section 7 and the road surface without substantially decreasing the rigidity of the land section.

The outboard shoulder sub groove 15 extends from an axially inner part of the second outboard shoulder lateral groove 14 (14a) toward one circumferential direction (d1) (upward in FIG. 1) across the adjacent first outboard shoulder lateral groove 13 to a position near the next second outboard shoulder lateral groove 14 (14b) and terminates without reaching to the groove 14b.

The outboard shoulder sub groove 15 in this example is straight and parallel with the tire circumferential direction in order to maintain axial rigidity and thereby to avoid deterioration of the steering stability. It is desirable for the same reason as above that the groove width W6 of the outboard shoulder sub groove 15 is set in a range of from 3 to 8% of the axial width La of the outboard shoulder land section 7, and the groove depth D8 of the outboard shoulder sub groove 15 is set in a range of from 1.0 to 2.0 mm.

The circumferential distance L7 between the circumferential end 15a of the outboard shoulder sub groove 15 and the second outboard shoulder lateral groove 14b is set in a range of from 7 to 17% of the circumferential distance Lb between the first outboard shoulder lateral groove 13 and the second outboard shoulder lateral groove 14b measured at the same axial position as the outboard shoulder sub groove 15.

The axial distance L8 from the outboard tread edge Teo to the groove center line 5G of the outboard shoulder sub groove 15 is preferably set in a range of from 65 to 85% of the axial width La of the outboard shoulder land section 7.

The outboard middle land section 8 is provided with a plurality of outboard middle lateral grooves 16 in order to provide groove volume necessary for the axial drainage required during cornering and to increase the groove edges to improve wet performance.

The outboard middle lateral groove 16 extends from the outboard shoulder main groove 3 toward the outboard crown main groove 5 and terminates within the outboard middle land section 8 without connected to the outboard crown main groove 5.

In this example, the outboard middle lateral grooves 16 extend straight and are inclined with respect to the tire axial direction to one circumferential direction (d1) toward the outboard tread edge Teo. However, the outboard middle lateral groove 16 may have a zigzag configuration. Further, the outboard middle lateral groove 16 may extend substantially parallel with the tire axial direction.

The axial length L9 of the outboard middle lateral groove 16 is preferably 33 to 43% of the axial width Lc of the outboard middle land section 8.

The groove width W7 of the outboard middle lateral groove 16 is preferably 2.0 to 4.5 mm.

The groove depth D9 of the outboard middle lateral groove 16 is preferably 5.0 to 7.0 mm.

In this example, the outboard middle land section 8 is further provided with outboard middle sipes S2 in order to optimize the ground pressure without excessively decreasing the rigidity of the outboard middle land section 8.

The outboard middle sipes S2 respectively extend axially inwardly from the axially inner ends 16i of the outboard middle lateral grooves 16 toward the same direction as the outboard middle lateral groove 16 and terminate within the outboard middle land section 8.

Further, the tread portion 2 is provided with a plurality of inboard lateral grooves 17 each extending from a position axially outside the inboard tread edge Tei to the tire equator c so that the inboard lateral groove 17 has an axially outer portion 17a between the inboard tread edge Tei and the inboard shoulder main groove 4, a middle portion 17b between the inboard shoulder main groove 4 and the inboard crown main groove 6, and an axially inner portion 17c extending from the inboard crown main groove 6 toward the outboard crown main groove 5 and terminating within the crown land section 9 without connected to the outboard crown main groove 5.

The axially outer portion 17a, middle portion 17b and axially inner portion 17c extend along a smoothly curved line to smoothly drain water existing between the crown land section 9 and the road surface toward the inboard tread edge side. The inboard lateral grooves 17 in this example are curved concavely toward the other circumferential direction (d2) (downward in FIG. 1)

on the other hand, the outboard land sections 7 and 8 are not provided with a lateral groove extending from the outboard tread edge Teo to the tire equator c along a straight or curved line in order to maintain the rigidity in the outboard land sections subjected to large axial force during cornering and thereby to improve the steering stability and the drainage in a well balanced manner.

It is desirable that the angle $\alpha 1$ of the inboard lateral groove 17 with respect to the tire axial direction is gradually decreased from the tire equator toward the inboard tread edge. Especially, it is desirable that the angle $\alpha 1a$ in the axially outer portion 17a is set in a range of from 0 to 30 degrees, the angle $\alpha 1b$ in the middle portion 17b is set in a range of from 30 to 50 degrees, and the angle $\alpha 1c$ in the axially inner portion 17c is set in a range of from 50 to 70 degrees.

Therefore, the lateral stiffness (rigidity) of the inboard shoulder land section 11 subjected to large axial force can be increased to improve the steering stability, and it becomes possible to enhance the drainage from the crown land section 9 subjected to a large ground pressure during straight running. From the aspect of the drainage, it is desirable that the groove width W8 of the inboard lateral groove 17 is gradually increased from the tire equator toward the inboard tread edge.

In order to secure the rigidity of each of the land sections 9, 10 and 11, it is desirable that the groove width W8a of the axially outer portion 17a is set in a range of from 2.0 to 5.0 mm, the groove width W8b of the middle portion 17b is set in a range of from 2.5 to 6.0 mm, and the groove width W8c of the axially inner portion 17c is set in a range of from 1.0 to 4.0 mm. Further, it is desirable that the groove depth D10a of the axially outer portion 17a is set in a range of from 6.0 to 7.0 mm, the groove depth D10b of the middle portion 17b is set in a range of from 3.0 to 7.0 mm, and the groove depth D10c of the axially inner portion 17c is set in a range of from 1.5 to 6.0.

In this example, an axially inner part of each of the axially outer portions 17a is provided with a tie bar T2, and an axially inner part of each of the middle portions 17b is provided with a tie bar T3 in order to reduce the transmittance of air resonance noise generated in the inboard shoulder main groove 4 and the inboard crown main groove 6 toward the inboard tread edge to improve the noise performance, and to increase the rigidity of the inboard middle land section 10 and the inboard shoulder land section 11 in the vicinity of the axially inner end of the axially outer portion 17a.

The inboard shoulder land section 11 is further provided with a plurality of inboard shoulder lateral grooves 18 to improve wet performance. The inboard shoulder lateral groove 18 extends axially outwardly from the inboard shoulder main groove 4 beyond the inboard tread edge Tei while inclining in the same direction as the axially outer portions 17a. One inboard shoulder lateral groove 18 is disposed between every two of the circumferentially adjacent axially outer portions 17a.

Further, the outboard shoulder land section 7 and/or the inboard shoulder land section 11 may be provided with closed type sipes S3 and/or semi-open type sipes S4 in order to improve wet performance without decreasing the rigidity of the land section.

In the example shown in FIG. 1, all of the lateral grooves and all of the sipes are inclined with respect to the tire axial direction to one circumferential direction (d1) toward the outboard tread edge Teo.

Comparison Tests

Based on the tread pattern shown in FIG. 1, pneumatic tires of size 195/65R15 (rim size 15×6JJ) were prepared and tested for the steering stability, noise performance and drainage.

Except for the specifications shown in Table 1, all of the tires had same specifications.

Common specifications are as follows.

Tread width TW: 158 mm
    Outboard shoulder main groove depth D1: 8.0 mm
    Inboard shoulder main groove depth D2: 8.0 mm
    Outboard crown main groove depth D3: 8.2 mm
    Inboard crown main groove depth D4: 8.2 mm
    Outboard shoulder lateral groove depth D5: 6.3 mm
    Outboard middle lateral groove depth D9: 5.9 mm
    Inboard lateral groove
        Axially inner portion's groove depth D10c: 3.6 mm
        Middle portion's groove depth D10b: 5.0 mm
        Axially outer portion's groove depth D10a: 6.3 mm
        Outboard shoulder tie bar's depth D6: 3.5 mm
        Sipe depth: 4.2 to 4.6 mm
    Inboard groove faces' angles $\theta 2a$, $\theta 2b$, and $\theta 2c$: 10 degrees
    Inboard groove face's angle $\theta 4$: 6 degrees <Steering Stability Test>

A 2000 cc FF passenger car provided on all of the four wheels with test tires was run on a dry asphalt road in a test course under a normal pressure of 200 kPa, and the test driver evaluated steering stability based on the handle response, rigidity, grip and the like. The results are indicated by an index based on Comparative example tire Ref. 1a being 100, wherein the larger the index number, the better the steering stability.

<Noise Performance Test>

During the above-mentioned test car was running on an road noise measuring road (rough-surfaced asphalt road) at a speed of 80 km/h, noise sound was measured in the inside of the car. The measuring position was near the driver's ear on the outside or window side of the car. Measured was the sound pressure level of a peak occurring at a frequency near 240 Hz—this frequency corresponds to that of the air resonance. The results are indicated by an index based on Comparative example tire Ref. 1a being 100, wherein the larger the index number, the better the noise performance.

<Drainage Test>

The test car was run along a 100 meter radius circle on an asphalt road partially provided with a 10 mm depth 20 m long water pool, and the lateral acceleration (lateral G) during running in the water pool was measured at the front wheels, gradually increasing the speed entering into the water pool, to obtain the average for the speed range of from 50 to 80 km/h. The results are indicated in Table 1 by an index based on Comparative example tire Ref. 1 being 100, wherein the larger is better.

From the test results, it was confirmed that the performances of the embodiment tires could be improved well balancedly in comparison with the comparative tires.

TABLE 1

| Tire | Ref. 1 | Ex. 1 | Ex. 2 | Ex. 3 | Ref. 2 | Ref. 3 | Ex. 4 | Ex. 5 | Ref. 4 | Ref. 5 |
|---|---|---|---|---|---|---|---|---|---|---|
| 2nd outboard shoulder lateral groove length L5 (% of La) | 100 | 75 | 85 | 95 | 85 | 85 | 85 | 85 | 85 | 85 |
| outboard middle lateral groove length L9 (% of Lc) | 38 | 38 | 38 | 38 | 38 | 38 | 38 | 38 | 38 | 38 |
| outboard groove face's angles θ1a, θ1b, θ1c (deg.) | 14 | 14 | 14 | 14 | 8 | 12 | 13 | 19 | 20 | 14 |
| outboard groove face's angle θ3 (deg.) | 10 | 10 | 10 | 10 | 10 | 10 | 10 | 10 | 10 | 8 |
| outboard shoulder tie bar's length L6 (% of La) | 15 | 15 | 15 | 15 | 15 | 15 | 15 | 15 | 15 | 15 |
| Steering stability | 100 | 109 | 108 | 106 | 100 | 102 | 106 | 110 | 110 | 102 |
| Noise performance | 100 | 105 | 105 | 104 | 99 | 102 | 104 | 106 | 106 | 102 |
| Drainage | 100 | 96 | 98 | 99 | 103 | 102 | 100 | 94 | 90 | 102 |

| Tire | Ex. 6 | Ex. 7 | Ref. 6 | Ref. 7 | Ex. 8 | Ex. 9 | Ex. 10 | Ex. 11 | Ex. 12 | Ex. 13 |
|---|---|---|---|---|---|---|---|---|---|---|
| 2nd outboard shoulder lateral groove length L5 (% of La) | 85 | 85 | 85 | 85 | 85 | 85 | 85 | 85 | 85 | 85 |
| outboard middle lateral groove length L9 (% of Lc) | 38 | 38 | 38 | 100 | 33 | 43 | 38 | 38 | 38 | 38 |
| outboard groove face's angles θ1a, θ1b, θ1c (deg.) | 14 | 14 | 14 | 14 | 14 | 14 | 14 | 14 | 14 | 14 |
| outboard groove face's angle θ3 (deg.) | 9 | 14 | 15 | 10 | 10 | 10 | 10 | 10 | 10 | 10 |
| outboard shoulder tie bar's length L6 (% of La) | 15 | 15 | 15 | 15 | 15 | 15 | 8 | 10 | 20 | 22 |
| Steering stability | 106 | 110 | 110 | 102 | 110 | 108 | 106 | 108 | 110 | 110 |
| Noise performance | 104 | 106 | 106 | 100 | 106 | 104 | 102 | 104 | 106 | 104 |
| Drainage | 100 | 94 | 90 | 104 | 94 | 98 | 100 | 98 | 94 | 94 |

The invention claimed is:

1. A pneumatic tire comprising:
a tread portion provided with an asymmetric tread pattern and having an outboard tread edge and an inboard tread edge between which a tread width is defined,
the tread portion provided with circumferentially continuously extending main grooves including an outboard shoulder main groove, an inboard shoulder main groove, an outboard crown main groove and an inboard crown main groove so as to axially divide the tread portion into
an outboard shoulder land section defined between the outboard shoulder main groove (3) and the outboard tread edge,
an outboard middle land section defined between the outboard shoulder main groove and the outboard crown main groove,
a crown land section defined between the outboard crown main groove and the inboard crown main groove,
an inboard middle land section defined between the inboard crown main groove and the inboard shoulder main groove, and
an inboard shoulder land section defined between the inboard shoulder main groove (4) and the inboard tread edge,
wherein
the groove width of the outboard shoulder main groove is 3 to 4% of the tread width,
the groove width of the inboard shoulder main groove is 5 to 6% of the tread width,
the groove width of the outboard crown main groove is 6 to 7% of the tread width,
the groove width of the inboard crown main groove is 6 to 7% of the tread width,
in each of the inboard shoulder main groove, the inboard crown main groove and the outboard crown main groove, an outboard groove face's angle θ1 is more than an inboard groove face's angle θ2, the outboard groove face's angle θ1 is 13 to 19 degrees, and the inboard groove face's angle θ2 is 9 to 14 degrees,
in the outboard shoulder main groove, an outboard groove face's angle θ3 is 9 to 14 degrees, and an inboard groove face's angle θ4 is 5 to 8 degrees,
the outboard shoulder land section is provided with a plurality of outboard shoulder lateral grooves extending axially inwardly from a position axially outside the outboard tread edge,
the outboard shoulder lateral grooves include first outboard shoulder lateral grooves whose axially inner ends are connected to the outboard shoulder main groove, and second outboard shoulder lateral grooves whose axially inner ends are terminated within the outboard shoulder land section without connected to the outboard shoulder main groove, and the first outboard shoulder lateral grooves and the second outboard shoulder lateral grooves are arranged alternately in the tire circumferential direction,
the outboard middle land section is provided with a plurality of outboard middle lateral grooves extending axially inwardly from the outboard shoulder main groove and terminating within the outboard middle land section without connected to the outboard crown main groove, wherein
each of the first outboard shoulder lateral grooves is provided in an axially inner part thereof with a tie bar rising from the groove bottom and provided with a sipe.

2. The pneumatic tire according to claim 1, wherein the tread portion is provided with a plurality of inboard lateral grooves extending from the tire equator to a position axially outside the inboard tread edge.

3. The pneumatic tire according to claim 1, wherein
the outboard shoulder land section is provided with a plurality of outboard shoulder sub grooves, and
each of the outboard shoulder sub grooves extends from one of the second outboard shoulder lateral grooves toward one circumferential direction across the adjacent first outboard shoulder lateral groove to a position near the next second outboard shoulder lateral groove to terminate without reaching thereto.

4. The pneumatic tire according to claim 1, wherein
the axial distance between the center line of the outboard shoulder main groove and the tire equator is in a range of from 23.5 to 27.5% of the tread width,
the axial distance between the center line of the inboard shoulder main groove and the tire equator is in a range of from 23.0 to 29.5% of the tread width,
the axial distance between the center line of the outboard crown main groove and the tire equator is in a range of from 6.0 to 10.5% of the tread width, and
the axial distance between the center line of the inboard crown main groove and the tire equator is in a range of from 6.0 to 10.5% of the tread width.

5. A pneumatic tire comprising:

a tread portion provided with an asymmetric tread pattern and having an outboard tread edge and an inboard tread edge between which a tread width is defined, the tread portion provided with circumferentially continuously extending main grooves including an outboard shoulder main groove, an inboard shoulder main groove, an outboard crown main groove and an inboard crown main groove so as to axially divide the tread portion into

- an outboard shoulder land section defined between the outboard shoulder main groove and the outboard tread edge,
- an outboard middle land section defined between the outboard shoulder main groove and the outboard crown main groove,
- a crown land section defined between the outboard crown main groove and the inboard crown main groove,
- an inboard middle land section defined between the inboard crown main groove and the inboard shoulder main groove, and
- an inboard shoulder land section defined between the inboard shoulder main groove and the inboard tread edge, wherein the groove width of the outboard shoulder main groove is 3 to 4% of the tread width, the groove width of the inboard shoulder main groove is 5 to 6% of the tread width, the groove width of the outboard crown main groove is 6 to 7% of the tread width, the groove width of the inboard crown main groove is 6 to 7% of the tread width, in each of the inboard shoulder main groove, the inboard crown main groove and the outboard crown main groove, an outboard groove face's angle θ1 is more than an inboard groove face's angle θ2, the outboard groove face's angle θ1 is 13 to 19 degrees, and the inboard groove face's angle θ2 is 9 to 14 degrees, in the outboard shoulder main groove, an outboard groove face's angle θ3 is 9 to 14 degrees, and an inboard groove face's angle θ4 is 5 to 8 degrees, the outboard shoulder land section is provided with a plurality of outboard shoulder lateral grooves extending axially inwardly from a position axially outside the outboard tread edge, the outboard shoulder lateral grooves include first outboard shoulder lateral grooves whose axially inner ends are connected to the outboard shoulder main groove, and second outboard shoulder lateral grooves whose axially inner ends are terminated within the outboard shoulder land section without connected to the outboard shoulder main groove, and the first outboard shoulder lateral grooves and the second outboard shoulder lateral grooves are arranged alternately in the tire circumferential direction, the outboard middle land section is provided with a plurality of outboard middle lateral grooves extending axially inwardly from the outboard shoulder main groove and terminating within the outboard middle land section without connected to the outboard crown main groove, the outboard shoulder land section is provided with a plurality of outboard shoulder sub grooves, and each of the outboard shoulder sub grooves extends from one of the second outboard shoulder lateral grooves toward one circumferential direction across the adjacent first outboard shoulder lateral groove to a position near the next second outboard shoulder lateral groove to terminate without reaching thereto.

6. The pneumatic tire according to claim 5, wherein the tread portion is provided with a plurality of inboard lateral grooves extending from the tire equator to a position axially outside the inboard tread edge.

7. The pneumatic tire according to claim 5, wherein the axial distance between the center line of the outboard shoulder main groove and the tire equator is in a range of from 23.5 to 27.5% of the tread width, the axial distance between the center line of the inboard shoulder main groove and the tire equator is in a range of from 23.0 to 29.5% of the tread width, the axial distance between the center line of the outboard crown main groove and the tire equator is in a range of from 6.0 to 10.5% of the tread width, and the axial distance between the center line of the inboard crown main groove and the tire equator is in a range of from 6.0 to 10.5% of the tread width.

* * * * *